United States Patent [19]
El-Antably et al.

[11] Patent Number: 6,064,134
[45] Date of Patent: *May 16, 2000

[54] ROTOR FOR A SYNCHRONOUS RELUCTANCE MACHINE

[75] Inventors: Ahmed Mostafa El-Antably; Moshen M. Erfanfar, both of Indianapolis; Ronald Allen Martin, Pendleton, all of Ind.

[73] Assignee: General Motors Corporation, Detroit, Minn.

[*] Notice: This patent is subject to a terminal disclaimer.

[21] Appl. No.: 09/122,448

[22] Filed: Jul. 24, 1998

[51] Int. Cl.[7] .............................. H02K 1/22; H02K 1/27
[52] U.S. Cl. ...................... 310/261; 310/156; 310/271; 310/217; 310/216; 310/162
[58] Field of Search .................. 310/271, 261, 310/217, 156, 216, 218, 262, 162

[56] References Cited

U.S. PATENT DOCUMENTS

| | | | |
|---|---|---|---|
| 2,446,999 | 8/1948 | Camilli | 310/217 |
| 3,250,976 | 5/1966 | McEntire | 310/261 |
| 4,110,646 | 8/1978 | Rao | 310/163 |
| 4,855,630 | 8/1989 | Cole | 310/156 |
| 4,924,130 | 5/1990 | Fratta | 310/261 |
| 5,296,773 | 3/1994 | El-Antably et al. | 310/261 |
| 5,801,470 | 9/1998 | Johnson et al. | 310/156 |
| 5,929,551 | 7/1999 | El-antably et al. | 310/216 |

FOREIGN PATENT DOCUMENTS

| | | | |
|---|---|---|---|
| 750613 | 8/1933 | France | 310/271 |
| 1143575 | 2/1969 | United Kingdom | 310/271 |

OTHER PUBLICATIONS

Cruickshank, Axially Laminated Aniotropic Rotors for Reluctance Motors, Dec. 1966.

*Primary Examiner*—Nestor Ramirez
*Assistant Examiner*—Burton Mullins
*Attorney, Agent, or Firm*—Margaret A. Dobrowitsky

[57] ABSTRACT

A rotor assembly for a synchronous reluctance machine has a plurality of steel punched star-shaped supports secured along a shaft at spaced locations for retaining a plurality of laminated rotor sections. The star-shaped supports have four equiangularly spaced arms having arcuate valleys disposed therebetween that define a plurality of channels for receiving the rotor sections. The rotor sections are secured to the star-shaped core by a plurality of bands fastened circumferentially around the rotor. A plurality of grooves disposed circumferentially around the rotor receive and retain the bands in place. A rotor bar and arcuate spring may be disposed within a concave cavity defined by the rotor sections to reduce audible noise produced as the rotor rotates at a high rate of speed and provide added compression on the rotor sections to the core. The rotor sections also include a dimpled separator of predetermined thickness disposed between the laminate sheets to optimize the machine. The separator is a steel sheet having a plurality of dimples that define the thickness of the separator. This results in a high speed axially-laminated synchronous reluctance rotor running at high speeds without any bolts or end caps in the rotor.

12 Claims, 10 Drawing Sheets

ND, 134

ROTOR FOR A SYNCHRONOUS RELUCTANCE MACHINE

TECHNICAL FIELD

The present invention relates generally to synchronous speed reluctance machines. More particularly, the present invention relates to the construction of rotors for a reluctance type machine.

BACKGROUND OF THE INVENTION

It is to be understood that the present invention relates to generators as well as to motors, however, to simplify the description that follows a motor will be described with the understanding that the invention also relates to generators. With this understanding, a synchronous reluctance motor is a synchronous machine that has a stator with poly-phase windings forming a plurality of poles which are similar to those of induction motors. The synchronous reluctance motor also includes a rotor that does not use windings or permanent magnets but does have the same number of poles as the stator. By providing a rotating field in the stator windings, a magnetomotive force acts upon the rotor resulting in the rotor being driven at a synchronous speed proportional to the rotating field in the stator.

The rotor synchronous reluctance generally includes a plurality of rotor sections formed of alternating magnetic and non-magnetic laminations secured to a unitary core. The core has a central axial bore for receiving a shaft. The laminations are inserted between radially extending arms of the core which are formed with a smooth, arcuate recess therebetween. The laminations are secured in the recesses by means of radial fasteners that secure radially-opposing rotor sections to the core. The rotor sections are also secured together by end caps and axial fasteners. The end caps are cup-shaped members with an axially extending outer rim that is disposed about the outermost periphery of the laminations. The axial fasteners extend through the end caps and core to secure the end caps to the rotor. The rotor laminations may also be bonded to one with another and to the core using an epoxy or other adhesive material. A full description of such a synchronous reluctance rotor is disclosed in U.S. Pat. No. 5,296,773 also assigned to the assignee of the present invention.

It is a common method of forming the rotor sections by winding a complete coil of the rotor about a mandrel and cutting the coil in any desired number of sections to form the rotor poles of a reluctance motor. The lamination is simply wound to the desired thickness of the rotor sections. Each segment of the rotor, therefore, is a single large piece of steel laminations having a thickness that is not magnetically related to the stator tooth thickness. This technique results in an un-optimized machine having an airgap pulsating flux component which generates high losses in the rotor.

SUMMARY OF THE INVENTION

It is, therefore, an object of the present invention to provide an improved rotor for a synchronous reluctance machine that secures the rotor sections to the shaft at low cost and simplify manufacturing.

It is another object of the present invention to provide an improved rotor for a synchronous reluctance machine that runs cooler than conventional rotors.

It is a further object of the present invention to provide an improved rotor having magnets disposed within the core to increase magnetic flux which increases the power factor of the machine and provides a wider range of rotational speed.

It is yet another object of the present invention to provide an improved rotor having rotor bars, spacers and bands for securing the rotor sections to the core which provides additional compression at the center of the rotor sections to enable operation of the rotor assembly at high rotational speeds without using any bolts or end caps to retain the rotor.

It is still another object of the present invention to provide an improved rotor that includes variable thickness laminate sections of the rotor sections to adjust the width of the rotor sections to be equal to or an integer of the stator tooth width to optimize the performance of the reluctance machine.

It is a further object of the present invention to provide an improved rotor that reduces outward thermal expansion.

It is yet another object of the present invention to provide an improved rotor that retains the rotor sections to the core using inexpensive filaments in different locations on the rotor to assure rotor integrity at high rotational speeds.

In accordance with the present invention, there is provided a rotor assembly for a synchronous reluctance motor that includes a star-shaped core secured on a rotor shaft. The core has a plurality of channels for supporting a plurality of generally arcuate rotor sections which are retained on the core by a plurality of bands disposed circumferentially about the rotor sections.

In accordance with another aspect of the present invention, there is provided a method of manufacturing a rotor assembly for a synchronous reluctance machine. The method includes securing a star-shaped core to a rotor shaft, wherein the core has a plurality of axial channels for receiving a plurality of laminated rotor sections. The rotor sections are mounted within the channels and secured to the core by a plurality of bands disposed circumferentially around the rotor sections.

In accordance with another aspect of the present invention, there is provided a rotor assembly for a synchronous reluctance motor that includes a star-shaped core secured onto a rotor shaft, wherein the core has a plurality of channels for supporting a plurality of arcuate rotor sections secured within a respective channel of the core. Each of the rotor sections including a plurality of stacked arcuate non-magnetic laminate sheets and a separator sheet disposed between laminate sections of the rotor sections.

In accordance with another aspect of the present invention, there is provided a method of manufacturing rotor sections for a rotor assembly for a synchronous reluctance machine. The method includes winding a continuous laminate sheet of non-magnetic material about a mandrel and providing a separator sheet having a plurality of dimples that define the thickness of the separator sheet. The separator sheet is wound concurrently with the laminate sheet at a predetermined interval to form a laminated coil. The separator sheet provides spacing between laminate sections of the rotor sections. The laminate coil is cut in quarters to form the rotor sections.

BRIEF DESCRIPTION OF THE DRAWINGS

The present invention will now be described, by way of example only, with reference to the accompanying drawings in which.

DESCRIPTION OF THE PREFERRED EMBODIMENT

Figure 1:
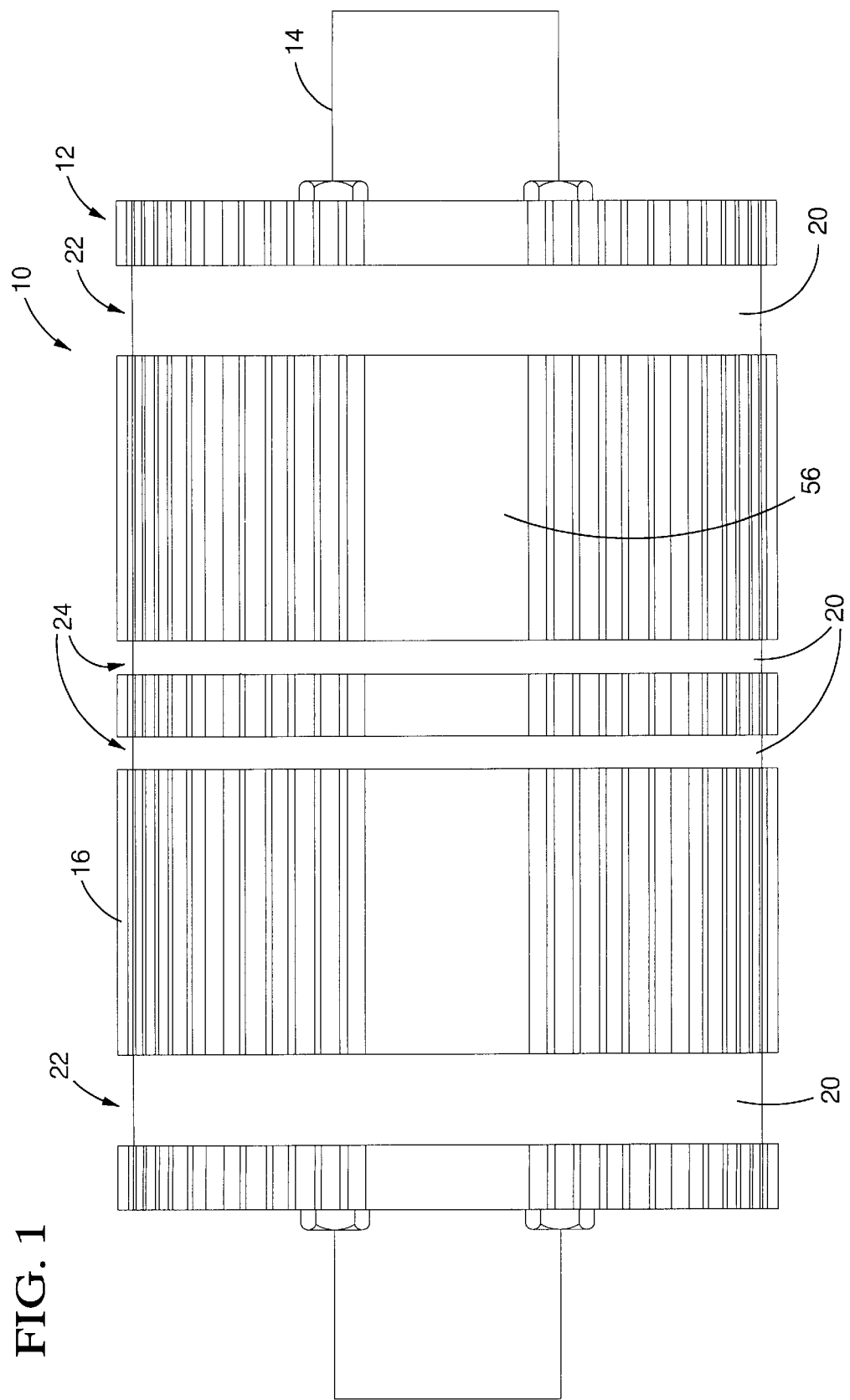
FIG. 1 is a side view of a rotor assembly embodying the present invention.
Figure 2:
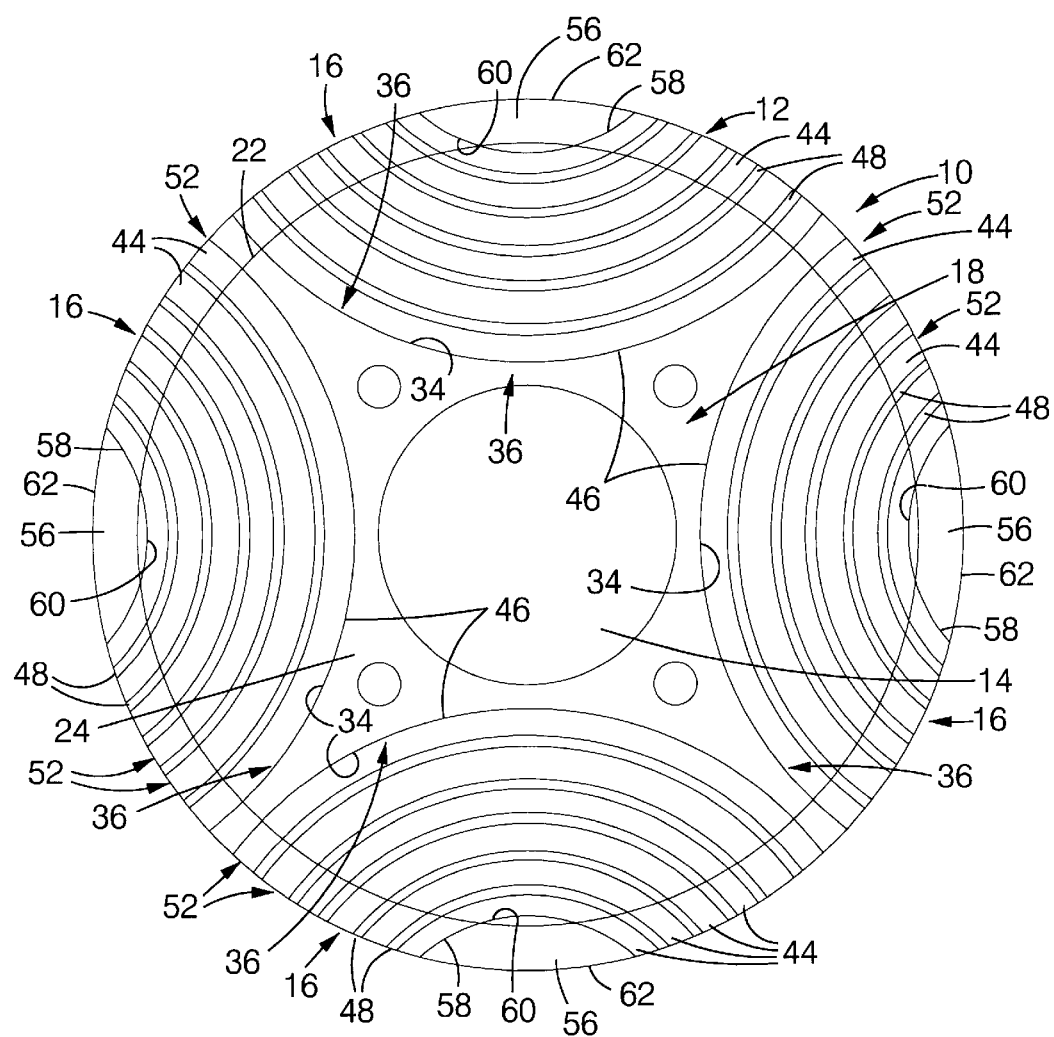
FIG. 2 is an end view of the rotor assembly of FIG. 1.

In FIGS. 1 and 2, there is shown a rotor assembly, generally designated 10, for a synchronous reluctance motor of the type embodying the present invention. The rotor assembly 10 comprises a rotor 12 carried on a shaft 14. The rotor includes a plurality of arcuate laminated rotor sections 16 secured to a star-shaped core 18 by a plurality of bands 20 fastened circumferentially around the rotor. A plurality of grooves 21,22 disposed circumferentially around the rotor 12 receive and retain the bands in place. Securing the rotor sections 16 to the core 18 using the fastening bands 20 allow rotor 12 speeds up to at least 20,000 RPM.

Figure 3:
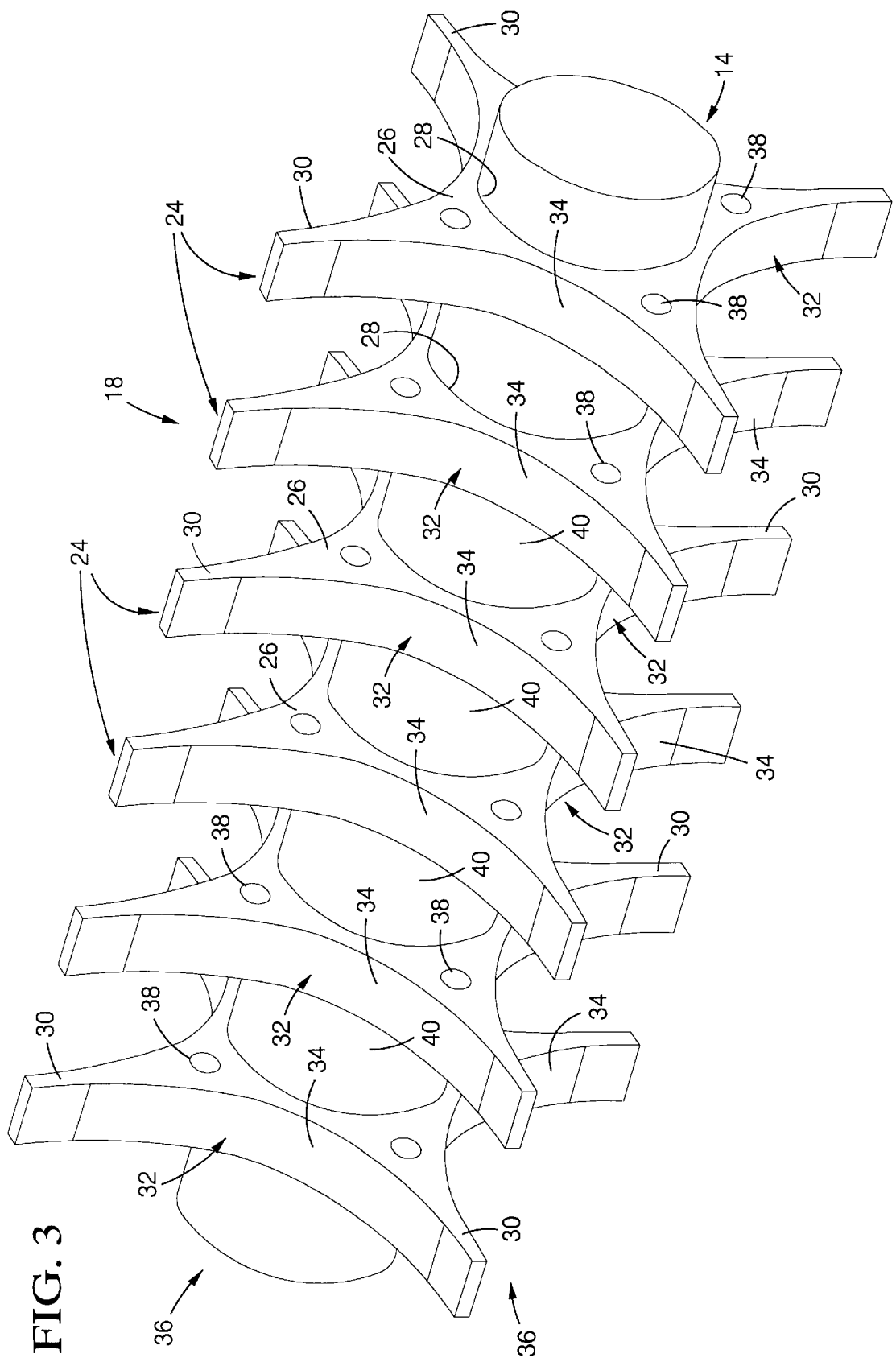
FIG. 3 is a perspective view of a partially assembled rotor assembly embodying the present invention.

Referring to FIG. 3, the core 18 is preferably formed of a plurality of star-shaped supports 24 spaced axially along the shafts 14, however, the core may comprise a single star-shaped support that extends the length of the rotor 12. The star-shaped supports 24 are formed from cutting or punching the supports out of fiberglass sheet material typically having a thickness of approximately 1.27 cm (0.5 inches). The fiberglass material provides a rigid support for the rotor sections 16, yet still absorb thermal expansion of the rotor sections inward toward the shaft 14. This feature is important because the air gap between the rotor 12 and stator is desirably kept as small as possible, approximately 38.1 mm (0.015 inches) and therefore, any outward expansion of the rotor may bind the motor.

Each star-shaped support 24 has a body portion 26 with a central axial bore 28 extending therethrough. Four equiangularly spaced arms 30 radiate outwardly from the body portion 26. Arcuate valleys 32 are disposed between adjacent arms 30 which provide a surface 34 for supporting the rotor sections 16 (see FIG. 2).

It will be appreciated by those skilled in the art that the plurality of star-shaped supports 24 offer a number of advantages. For instance, the cost to manufacture the skeletal core 18 is reduced due to the use of less material which also reduces the weight of the rotor 12 by as much as 5–10% from previous single piece molded design. Other costs associated with molding single piece cores are also eliminated. Furthermore, the rotor 12 will run cooler as a result of the space 40 disposed between the coiled rotor sections 16 and the shaft 14.

The star-shaped supports 24 are preferably press fit and epoxied onto the shaft 14 at defined equi-spaced locations to form the core 18. A sufficient number of star-shaped supports 24 must be disposed along the shaft 14 to withstand the compressive forces generated by the banding of the rotor sections 16 thereto. Each star-shaped support 24 is oriented on the shaft 14 so that the valleys 32 are disposed longitudinally along the axis of the shaft to provide channels 36 for receiving the rotor sections 16.

As shown in FIGS. 2 and 3, each star-shaped support 24 may include a through bore 38 disposed in each of the arms 30 to provide fluid communication between each of the cavities 40 between the star-shaped supports. The bores 38 allow varnish or epoxy that may have flowed within the cavities 40 during a coating process to drain therethrough.

Figure 4:
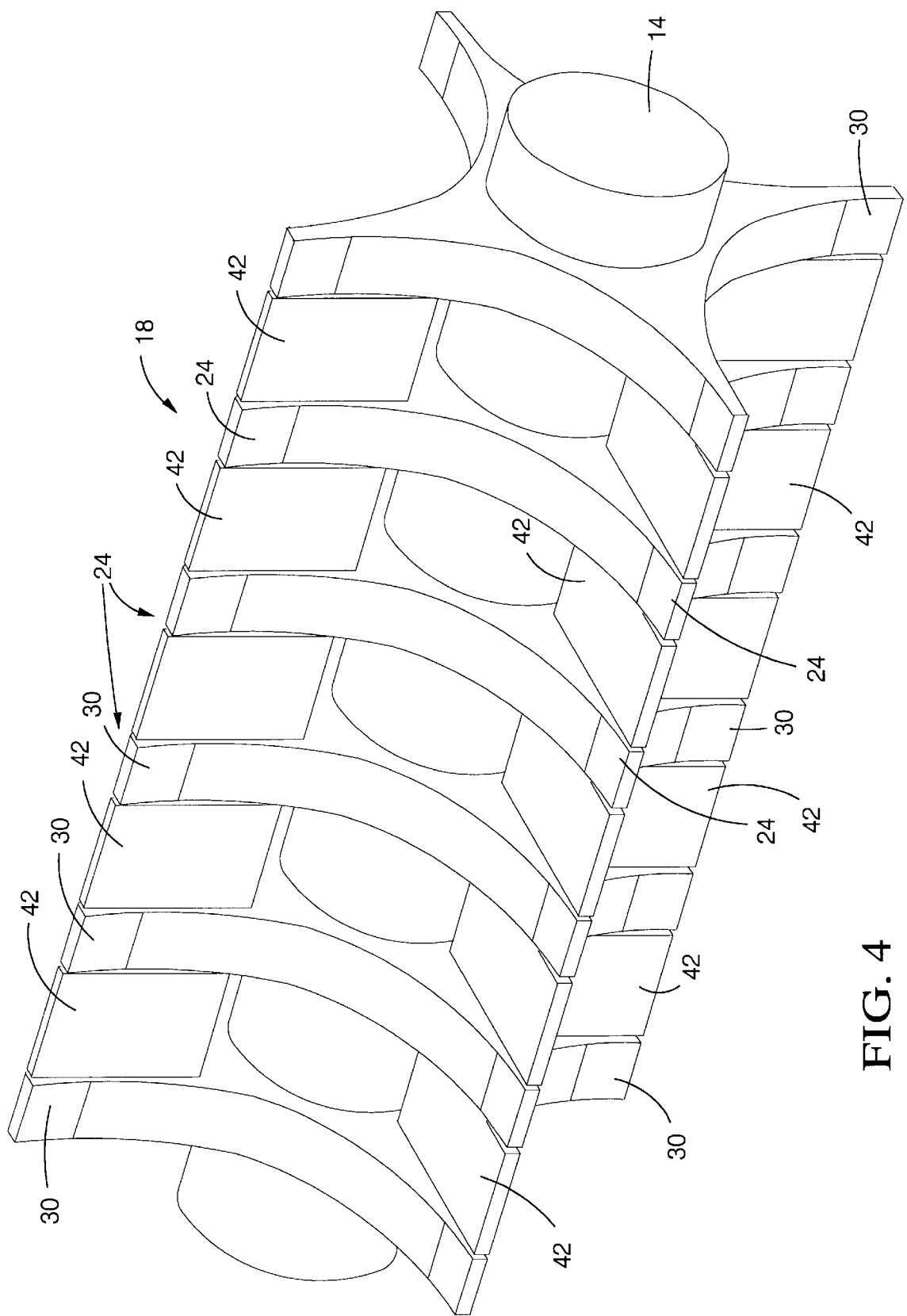
FIG. 4 is a perspective view of a partially assembled rotor assembly of a second embodiment of the present invention.

In an alternative embodiment shown in FIG. 4, a plurality of permanent magnets 42 may be inserted between adjacent star-shaped supports 24. Specifically, a permanent magnet 42 may be secured by epoxy or other adhesive between the arms 30 of adjacent star-shaped supports 24. The magnets 42 increase the magnetic flux which increases the power factor of the machine resulting in a wider range of operating speed for the rotor assembly 12.

As best shown in FIG. 2, the laminated rotor sections 16 include a plurality of stacked arcuate magnetic laminates 44 whereby the curvature of the outer convex surface 46 of each rotor section 16 is complementary to the curvature of the surface 34 of the valleys 36 of the star-shaped supports 18 for mating thereto. Each laminated rotor section 16 includes a plurality of separators 48 to optimize the performance of the synchronous reluctance motor. The ratio of insulation (i.e., air) to laminates 44 of each rotor section 16 is preferably between 0.4 to 0.5.

Figure 5:
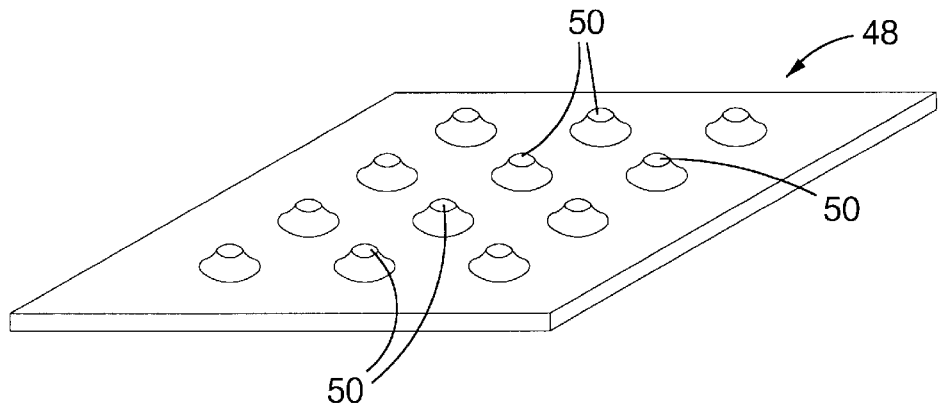
FIG. 5 is a perspective view of a separator sheet ofd the rotor assembly of FIG. 1.

As shown in FIG. 5, the separators 48 are formed of sheet material having a plurality of dimples 50 disposed therein to provide sufficient spacing or insulation between adjacent laminates 44 (see FIG. 2). The separators are preferably formed of a steel because it can withstand the high temperature of the annealing process, and provide sufficient strength to withstand the stresses encountered during the coiling process, which will be described in greater detail hereinafter. Further, the steel separators 48 may be easily incorporated during the coiling process. Moreover, the steel separator has the same temperature coefficient as the steel laminates 44 which prevents any problems due to differential thermal expansion of dissimilar materials. Separators 48 formed of steel sheet having dimples 50 provide material compatibility, strength and an inexpensive way of incorporating the separators during the coiling process.

As best shown in FIG. 2, the steel separators 48 may be disposed at various depths of a rotor section 16 to provide laminate sections 52 having different widths. The width of the spaced defined by the separators 48 between the laminate sections 52 may also be varied by inserting separators of different thickness. The thickness of each separator 48 is defined by the height of the dimples 50 (see FIG. 5) disposed therein, and therefore insulation thickness of the rotor sections 16 may be changed simply by changing the height of the dimples 50. This capability of providing rotor sections 16 having laminate sections 52 of different thicknesses separated by fixed or variable spaced 54 allows the performance of the synchronous reluctance motor to be optimized.

As shown in FIGS. 1 and 2, rotor bars 56, formed of non-magnetic material such as fiberglass, are mounted within the outermost concave cavity 58 of the rotor sections 16. The rotors bars 56 have an inner convex surface 60 that is complementary to the concave cavities 58 of the rotor sections 16. The rotor bars may also be adhered to the rotor sections using an epoxy. The outer surface 62 of the rotor bars 56 are rounded to have a radius equal to the outer radius of the rotor 12. The rotor bar functions to reduce the audible noise associated with the high speed of rotation of the rotor during operation.

Figure 6:
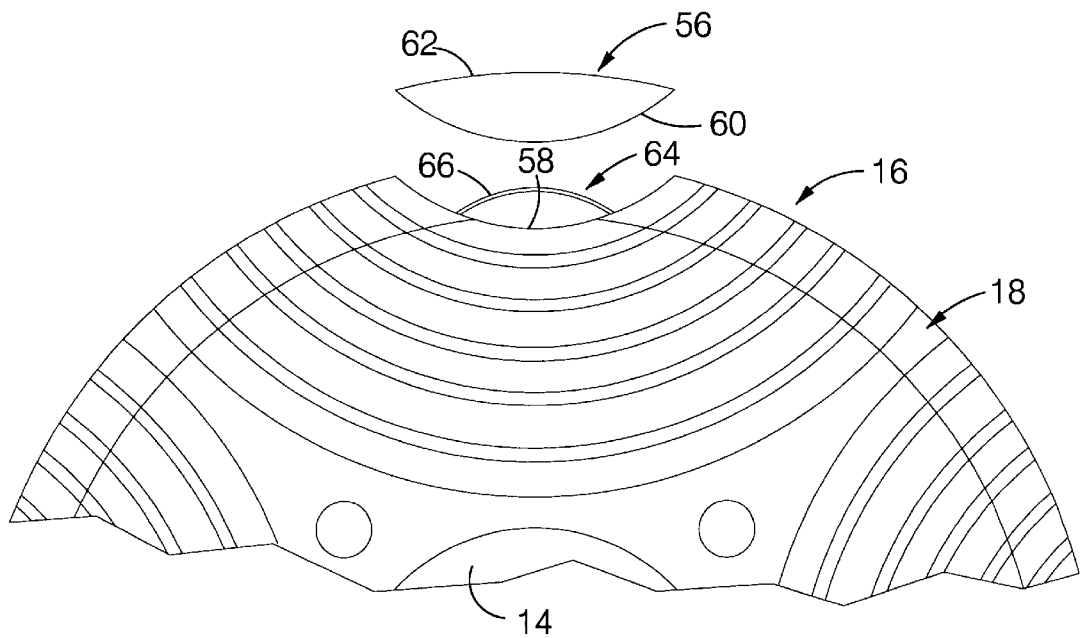
FIG. 6 is an end view of a partially disassembled portion of the rotor assembly of FIG. 1.

As shown in FIG. 6, the rotor assembly 10 may also include an arcuate spring 64 disposed between each rotor section 16 and respective rotor bar 56. The spring 64 is placed within the concave cavity 58 of the rotor section 16 such that the convex surface 66 of the spring 64 extends outwardly from the shaft 14. The springs 64 are preferably formed of aluminum or stainless steel. When the rotor bar 56 is epoxied within the concave cavity 58, the spring 64 is compressed inward which provides a spring force urging the rotor sections 16 onto the star-shaped supports 18 against the retention forces of the banding. The spring 64 provides higher compression load around the top section of the rotor bar 56 area where most rotor 12 expansion and bulging occurs as a result of the large centrifugal forces (i.e., 25,000 Lbf @ 10,000 RPM). Consequently, the added compression at these areas of the rotor sections 16 provided by the spring enable the rotor assembly 10 to operate at higher speeds. In addition, due to better containment and load distribution provided by the spring 64 and rotor bar 56, less filament 20 for banding the rotor 12 is needed at high speed.

Referring to FIG. 1, the rotor 12 includes a plurality of circumferential grooves 21,22 for receiving the fastening bands 20. A plurality of bands 20 are secured about the periphery surface of the rotor 12 within the grooves 22. It has been determined that the width and location of the grooves about the rotor determine the output torque of the motor. Specifically, the rotor expansion decreases provided the width of the bands 20 increase as the bands are disposed outwardly from the center of the rotor 12. For example, the rotor assembly shown in FIG. 1 includes four grooves 21,22. One pair of grooves 21 are disposed at a center portion of the rotor 12 having widths that are substantially less than the widths of the second pair of grooves 22 disposed at the end portions of the rotor to minimize the machine electrical performance degradation due to the grooves. The grooves 21,22 and bands 20 preferably wrap around the rotor 12 in alignment with the star-shaped supports 18 along the shaft 14 to assure rotor integrity at operation at high rotational speeds. The grooves 22 could be located just outside the stator active surface to minimize any degradation in the motor electrical performance due to the grooves.

The bands 20, which may be formed of Kevlar, fiberglass or carbon filaments, are retained together within the grooves 21,22 by an epoxy. Alternatively, the bands may comprise stainless steel wire that is secured together by tack welding. Mylar (not shown) may then be heat shrunk over the wire bands to retain the epoxy around the bonding area in the circumferential grooves.

Figure 7:
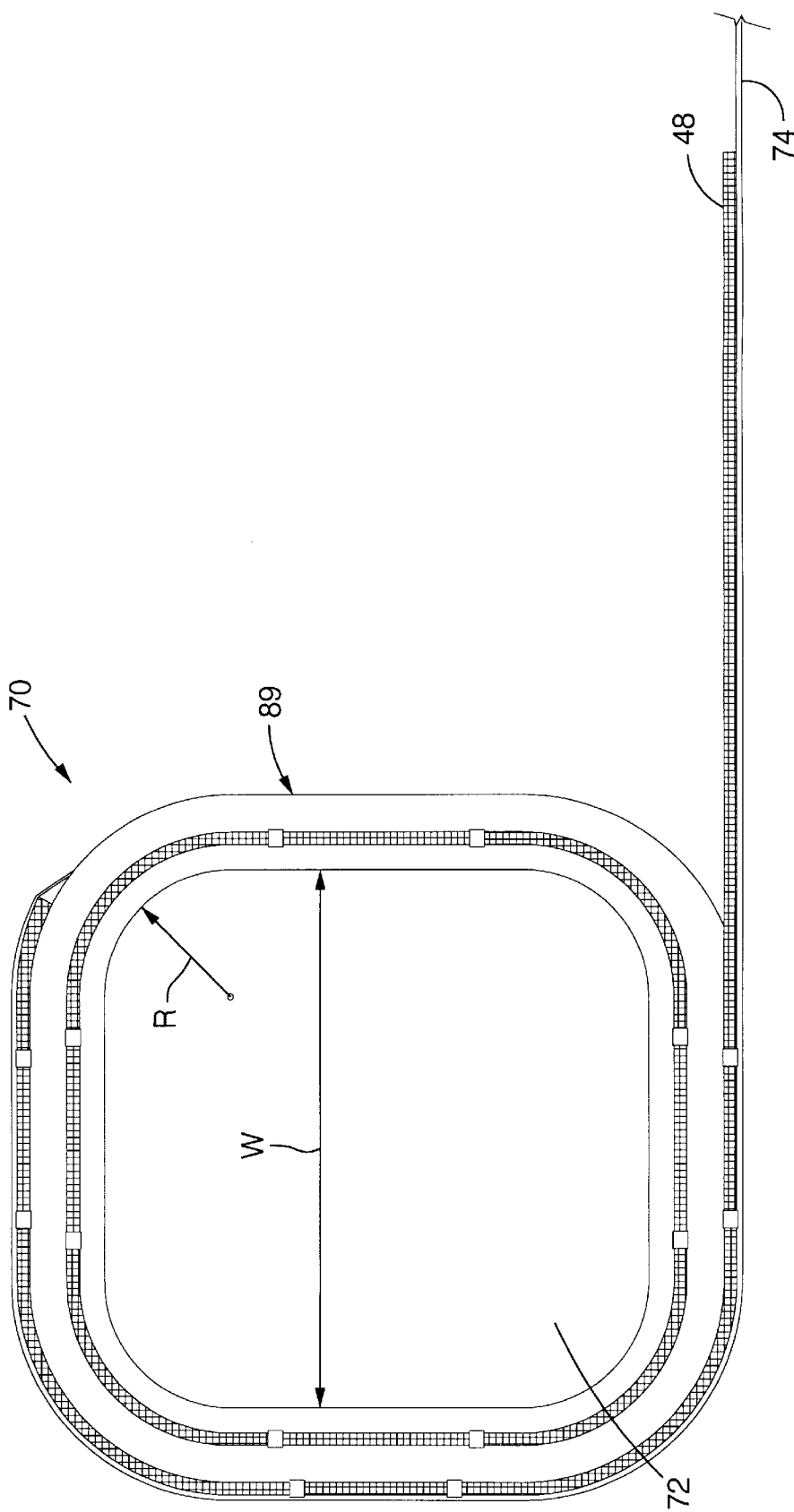
FIG. 7 is a schematic view of a system for forming the laminated sections of the rotor assembly of FIG. 1 shown at a point during its manufacturing process.

FIG. 7 illustrates a system 70 for forming the laminated rotor sections 16 (see FIG. 1). The system includes a mandrel 72 for coiling steel feed stock 74 in a generally square shape.

Figure 8:
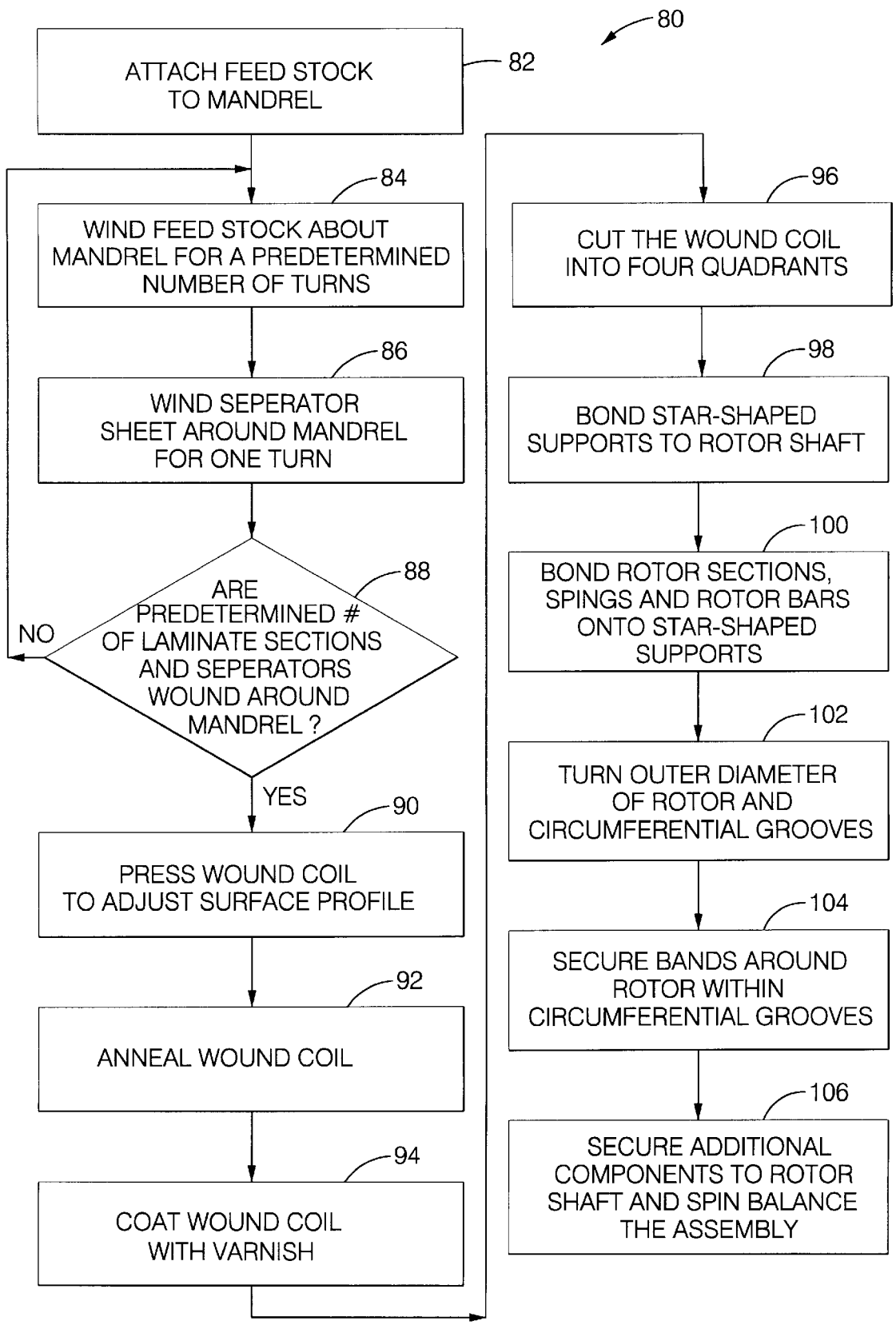
FIG. 8 is a flowchart illustrative of the method of manufacturing a rotor assembly in accordance with the present invention.

The method 80 of manufacturing the rotor assembly 10 is illustrated in FIG. 8. In block 82 the rotor sections 16 are first formed by slitting the feed stock 74 to the correct width and one end of the lamination is locked to a mandrel 72 of a winding machine (not shown). The width is defined by stack height of a stator and amount of banding needed for both ends of rotor 12 for containment. The mandrel 72 is machined to the correct width (W) and radius® to match the final lamination coiling profile and rotor bars 56 inner radius.

In blocks 84 and 86, the lamination 74 and steel separators 48 with dimples 50 are then wound about the mandrel 72. The winding speed and the tension on the feed stock 74 is appropriately adjusted. The feel stock is then wound for a predetermined number of turns in accordance with a pre-defined coiled thickness for a first laminate section 52. The pre-fabricated separator 48 is then inserted between the feed stock 74 and mandrel wound coil 89 and wound thereon for one complete turn. In block 88, the steps in blocks 84 and 86 are repeated for the specified number of laminate sections 52 and separators 48. The fee stock 74 is then sheared and spot welded to the wound coil 89 (see FIG. 7).

Figure 10:
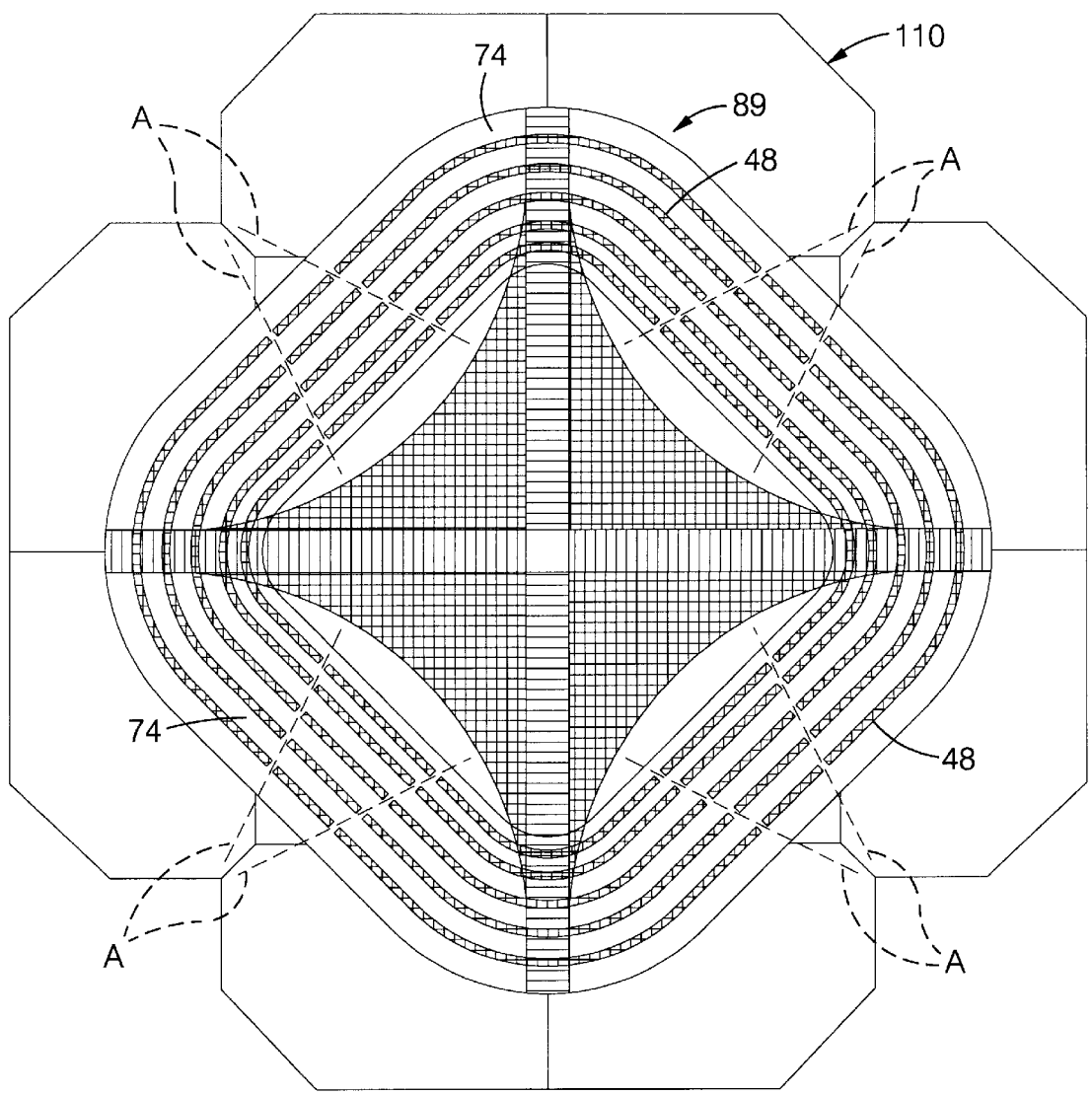

The radius and flat surface profile of the wound coil 89 is measured and adjusted by mounting the coil within a fixture 90 and compressing the coil using a heavy hydraulic press as shown in FIG. 10 (see block 90). The fixture forms the radii and angles of the wound coil to fit properly on the star-shaped supports 24 without gaps or need for extra machining. Both ends of wound coil 89, across lamination sections, are temporarily welded. In block 92 the wound coil 89 is annealed which gives the rotor sections 16 good magnetic properties. The mandrel 72 is pressed out from the wound coil 89 and the wound coil 89 is dipped in a vacuum varnish impregnation tank (see block 94) and then cured in an oven. After curing the wound coil 89 in block 96, the coiled laminated is cut to quadrants along broken lines A in FIG. 10 to form four arcuate laminated rotor sections 16.

Figure 11:
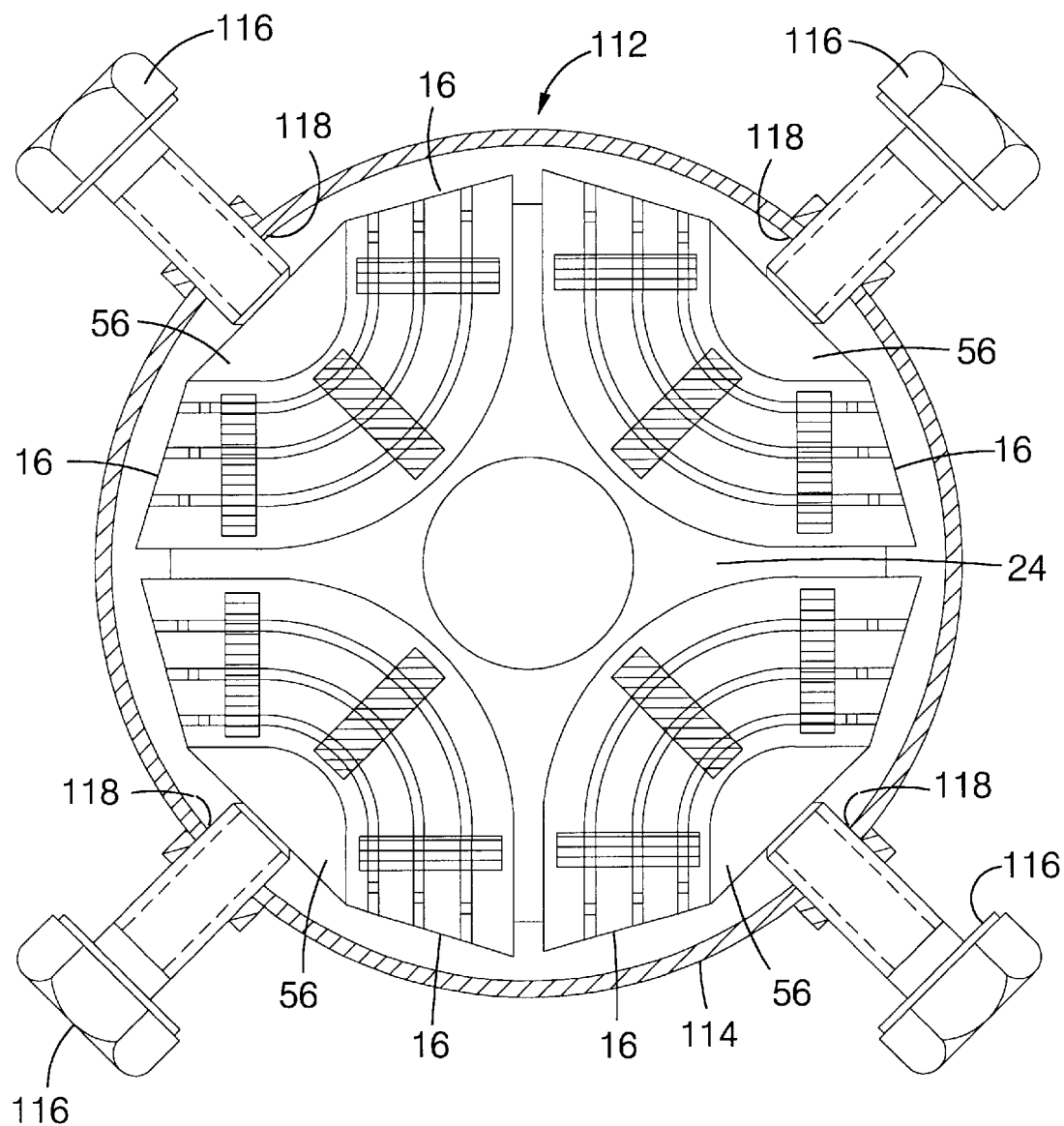

In blocks 98 and 100, the pre-fabricated fiberglass star-shaped supports 24 are secured to the shaft 14 by first applying a thin coat of epoxy to the shaft and the star-shaped supports, and then pressing the supports onto the shaft at pre-determined locations. The laminated rotor sections 16 are also coated with this epoxy and placed on the star-shaped supports 24. The springs 64 are placed within the longitudinal cavity 58 of the rotor sections 16, and the pre-fabricated rotor bars 56 are coated with epoxy and placed within the longitudinal cavity. The partially assembled rotor assembly 10 is inserted within a bonding fixture 106 (see FIG. 11) to clamp all four rotor sections 16 to the star-shaped supports 24. The bonding fixture 106 comprises a tubular housing 108 having a plurality of bolts 110 threaded through bores 112 disposed longitudinally along the housing. The bolts 110 are aligned to engage the rotor bars 56 of each rotor section 16, and tighten to provide sufficient force to compress the spring 64 to the rotor section and the rotor section to the star-shaped supports 24. After the rotor assembly is clamped within the bonding fixture 106, the fixture is placed in an oven to cure the high strength epoxy.

Alternative rotor cores and lamination fastening techniques are disclosed in co-pending application, ROTOR SECTION CONTAINMENT WITH STEEL PUNCHED STAR, U.S. patent application Ser. No. 09/122447 filed on. Jul. 24, 1998, which is herein incorporated by reference in its entirety.

In blocks 102 and 104, the outside diameter of the rotor assembly 10 is ground and four circumferential grooves 21,22 are machined for banding the springs 64 placed within the concave cavity 58 of the grooves. Using a banding machine, all 4 grooves are banded with Kevlar filament while applying filament wound epoxy. The rotor assembly 12 is then cured in an oven.

Finally, a slinger, pinion gear and encoder (not shown) insert are pressed onto the shaft 14. The rotor assembly 10 is then balanced (see block 106).

Figure 9:
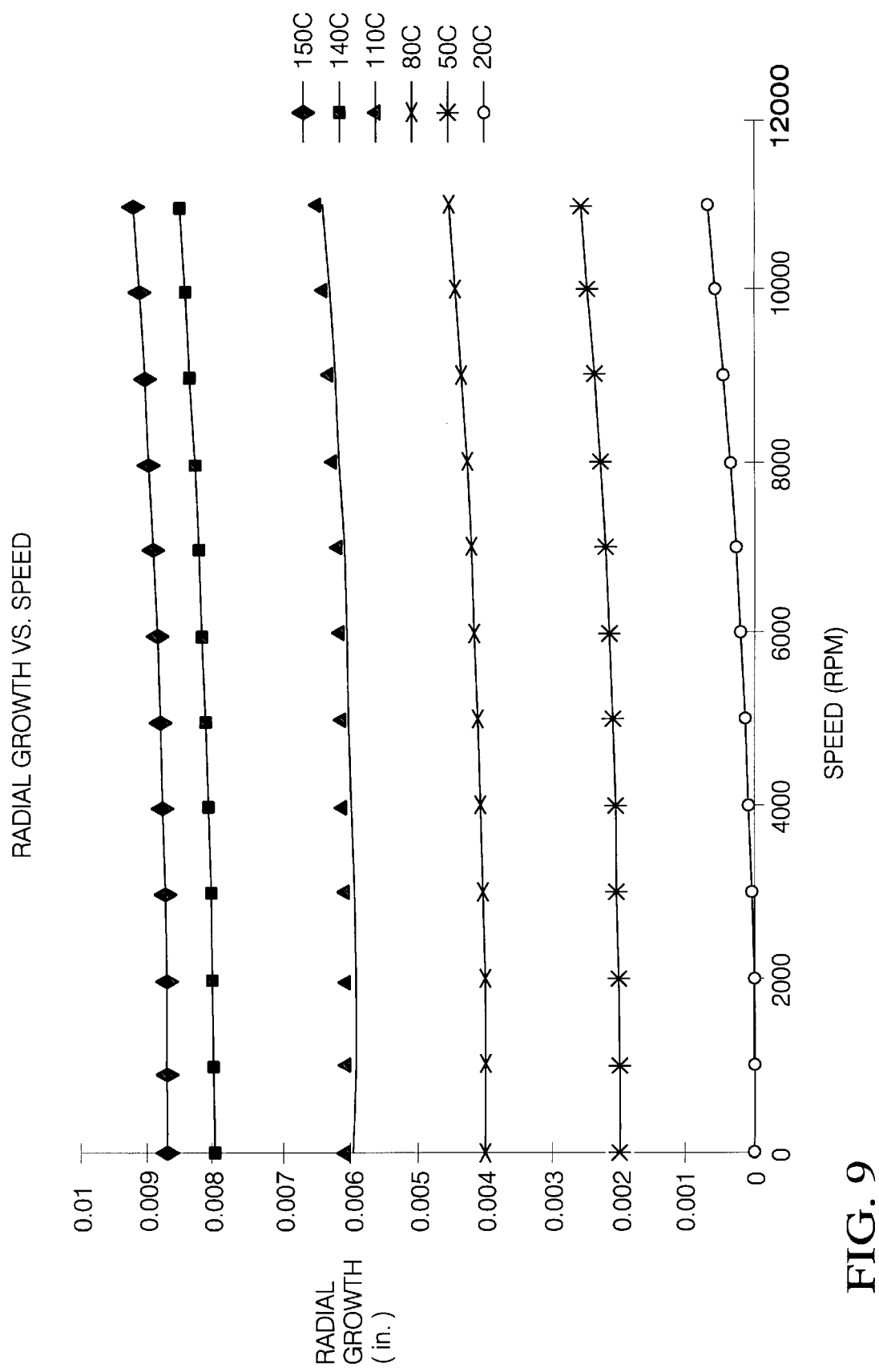
FIG. 9 is a graphical representation of the radial growth of a rotor assembly embodying the present invention versus its rotational speed.

An important advantage of the present invention is that it provides an improved rotor assembly 10 to contain the rotor sections 16 to the core 18 which enables the rotor 12 to operate at higher rotational speeds as graphically illustrated in FIG. 9. The graph plots the radial growth (inches) of the rotor 12 of the present invention versus its rotational speed (RPM). The radial growth is also plotted as a function of the rotor temperature which ranges between 20C and 150C. An important characteristic to note is that the radial growth as the rotational speed increases is minimal.

It will be understood that a person skilled in the art may make modifications to the preferred embodiment shown herein within the scope and intent of the claims. While the present invention has been described as carried out in a specific embodiment thereof, it is not intended to be limited thereby but is intended to cover the invention broadly within the scope and spirit of the claims.

What is claimed is:

1. A rotor assembly for a synchronous reluctance motor; said rotor assembly comprising:

a shaft;

a core having a plurality of shaped supports, said supports being configured, dimensioned and positioned to define a plurality of channels, said core being mounted on said shaft;

a plurality of generally arcuate rotor sections, each of said rotor sections secured within a respective channel of said core; and a plurality of bands disposed circumferentially about said rotor sections for securing said rotor sections to said core.

2. The rotor assembly, as defined in claim 1, wherein said shaped supports comprise a body portion having a central axial bore disposed therethrough, a plurality of arms extending radially from said body portion, and a valley disposed between each of said arms, said valleys having an arcuate surface.

3. A rotor assembly for a synchronous reluctance motor; said rotor assembly comprising:

a shaft;

a core having a plurality of shaped supports, said supports being configured, dimensioned and positioned to define a plurality of channels, said core being mounted on said shaft;

a plurality of generally arcuate rotor sections, each of said rotor sections secured within a respective channel of said core;

a plurality of bands disposed circumferentially about said rotor sections for securing said rotor sections to said core; and a permanent magnet mounted between said arms of a pair of adjacent star-shaped supports.

4. A rotor assembly for a synchronous reluctance motor; said rotor assembly comprising:

a shaft;

a star-shaped core having a plurality of channels mounted on said shaft;

a plurality of generally arcuate rotor sections, each of said rotor sections secured within a respective channel of said core; and a plurality of bands disposed circumferentially about said rotor sections for securing said rotor sections to said core;

wherein the rotor sections include a plurality of circumferential grooves for receiving said bands.

5. The rotor assembly, as defined in claim 4, wherein the rotor sections have grooves having predetermined widths, wherein grooves disposed at end portions of said rotor sections have widths greater than the widths of grooves disposed at central portions of said rotor sections.

6. A rotor assembly for a synchronous reluctance motor; said rotor assembly comprising:

a shaft;

a star-shaped core having a plurality of channels mounted on said shaft;

a plurality of generally arcuate rotor sections, each of said rotor sections secured within a respective channel of said core, and comprising a plurality of arcuate magnetic laminate sections and separator sheet disposed between laminate sections, said separator sheet having plurality of dimples that define the thickness of the separator sheet; and a plurality of bands disposed circumferentially about said rotor sections for securing said rotor sections to said core.

7. A rotor assembly for a synchronous reluctance motor; said rotor assembly comprising:

a shaft;

a star-shaped core having a plurality of channels mounted on said shaft;

a plurality of generally arcuate rotor sections, each of said rotor sections secured within a respective channel of said core;

a rotor bar disposed within an outer cavity defined by said arcuate rotor sections;

an arcuate spring disposed between a rotor bar and a rotor section that provides a spring force urging said rotor section to said core; and a plurality of bands disposed circumferentially about said rotor sections for securing said rotor sections to said core.

8. A method of manufacturing a rotor assembly for a synchronous reluctance machine; said method comprising:

securing a shaped core onto a shaft, the core having a plurality shaped supports, said supports being configured, dimensioned and positioned to define a plurality of channels, wherein said shaped core is formed by securing a plurality of shaped supports onto said shaft;

mounting a plurality of laminated rotor sections within said channels; and securing said rotor sections to said core by a plurality of bands disposed circumferentially around said rotor sections.

9. A method of manufacturing a rotor assembly for a synchronous reluctance machine; said method comprising:

securing a star-shaped core onto a shaft, the core having a plurality of channels;

mounting a plurality of laminated rotor sections within said channels;

mounting a rotor bar to each laminated rotor section;

disposing an arcuate spring intermediate said rotor bars and said rotor sections to provide additional compression force onto said rotor sections; and securing said rotor sections and rotor bars to said core by a plurality of bands disposed circumferentially around said rotor sections.

10. A rotor assembly for a synchronous reluctance motor; said rotor assembly comprising:

a shaft;

a shaped core having a plurality of shaped supports, said supports being configured, dimensioned and positioned to define a plurality of channels mounted on said shaft; and a plurality of generally arcuate rotor sections, each of said rotor sections secured within a respective channel of said core, and comprising a plurality of arcuate magnetic laminate sections and separator sheet disposed between laminate sections, wherein the thickness of said laminate sections are different.

11. A rotor assembly for a synchronous reluctance motor; said rotor assembly comprising:

a shaft;

a shaped core having a plurality of shaped supports, said supports being configured, dimensioned and positioned to define a plurality of channels mounted on said shaft; and a plurality of generally arcuate rotor sections, each of said rotor sections secured within a respective channel of said core, and comprising a plurality of arcuate magnetic laminate sections and a plurality of separator sheets disposed between laminate sections, wherein at least two of said separator sheets of each rotor sections have different thicknesses.

12. A rotor assembly for a synchronous reluctance motor; said rotor assembly comprising:

a shaft;

a star-shaped core having a plurality of channels mounted on said shaft; and a plurality of generally arcuate rotor sections each secured within a respective channel of said core, each of said rotor sections including a plurality of stacked arcuate magnetic laminate sections and a separator sheet disposed between laminate sections, wherein the separator sheet has a plurality of dimples.

* * * * *